(12) United States Patent
Watnik et al.

(10) Patent No.: US 9,917,989 B2
(45) Date of Patent: Mar. 13, 2018

(54) METHOD AND APPARATUS OF SIMULTANEOUS SPATIAL LIGHT MODULATOR BEAM STEERING AND SYSTEM ABERRATION CORRECTION

(71) Applicants: Abbie T. Watnik, Washington, DC (US); Vincent A. Cassella, Springfield, VA (US)

(72) Inventors: Abbie T. Watnik, Washington, DC (US); Vincent A. Cassella, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 349 days.

(21) Appl. No.: 14/711,890

(22) Filed: May 14, 2015

(65) Prior Publication Data

US 2015/0365577 A1    Dec. 17, 2015

Related U.S. Application Data

(60) Provisional application No. 62/012,536, filed on Jun. 16, 2014.

(51) Int. Cl.
| | |
|---|---|
| *H04N 5/238* | (2006.01) |
| *H04N 5/217* | (2011.01) |
| *G02B 27/00* | (2006.01) |
| *G02B 26/06* | (2006.01) |

(52) U.S. Cl.
CPC ............. *H04N 5/217* (2013.01); *G02B 26/06* (2013.01); *G02B 27/0025* (2013.01)

(58) Field of Classification Search
CPC ..... H04N 5/217; G02B 26/06; G02B 27/0025
See application file for complete search history.

(56) References Cited

U.S. PATENT DOCUMENTS

| | | | | |
|---|---|---|---|---|
| 5,973,844 | A * | 10/1999 | Burger | G02B 3/0056 |
| | | | | 359/621 |
| 6,381,072 | B1 * | 4/2002 | Burger | G02B 3/0056 |
| | | | | 359/621 |
| 6,489,992 | B2 * | 12/2002 | Savoye | H04N 5/20 |
| | | | | 348/340 |
| 7,283,291 | B2 | 2/2007 | Maram et al. | |
| 7,742,213 | B2 | 6/2010 | Potsaid et al. | |

(Continued)

OTHER PUBLICATIONS

Vorontsov et al., Stochastic parallel-gradient-descent technique for high-resolution wave-front phase-distortion correction, J. Opt. Soc. Am. A., Oct. 1998, pp. 2745-2758, vol. 15, No. 10, Optical Society of America, USA.

(Continued)

*Primary Examiner* — Christopher Findley
(74) *Attorney, Agent, or Firm* — US Naval Research Laboratory; Suresh Koshy

(57) ABSTRACT

A method and apparatus for simultaneous spatial light modulator beam steering and system aberration correction. The apparatus includes a spatial light modulator, a wide-field optical system, the wide-field optical system including at least one optical system aberration; and a camera. The wide-field optical system collimates a light beam toward the camera. The camera communicates with the spatial light modulator via a feedback loop that pre-corrects for the at least one optical system aberration.

12 Claims, 4 Drawing Sheets

(56) References Cited

U.S. PATENT DOCUMENTS

| | | | | |
|---|---|---|---|---|
| 8,022,345 B1* | 9/2011 | Chang | ................. | G01J 9/02 |
| | | | | 250/201.9 |
| 8,730,573 B2* | 5/2014 | Betzig | ................. | G01J 9/00 |
| | | | | 250/461.2 |
| 2006/0049331 A1* | 3/2006 | Smith | ................. | G01J 1/4257 |
| | | | | 250/201.9 |
| 2006/0227402 A1* | 10/2006 | Maram | ................. | G01J 9/00 |
| | | | | 359/279 |
| 2007/0132998 A1* | 6/2007 | Tang | ................. | G01N 21/6458 |
| | | | | 356/417 |
| 2009/0046298 A1* | 2/2009 | Betzig | ................. | G01N 21/6445 |
| | | | | 356/521 |
| 2009/0250591 A1* | 10/2009 | Yamashita | ................. | G02B 26/0841 |
| | | | | 250/201.9 |
| 2010/0135547 A1* | 6/2010 | Lee | ................. | G06T 3/4084 |
| | | | | 382/128 |
| 2010/0142014 A1* | 6/2010 | Rosen | ................. | G03B 35/02 |
| | | | | 359/1 |
| 2011/0096292 A1* | 4/2011 | Saito | ................. | G02B 26/06 |
| | | | | 351/206 |
| 2014/0268262 A1* | 9/2014 | Cassella | ................. | G03H 1/2294 |
| | | | | 359/4 |
| 2016/0327779 A1* | 11/2016 | Hillman | ................. | G02B 21/367 |

OTHER PUBLICATIONS

Vorontsov et al., Adaptive optics based on analog parallel stochastic optimization: analysis and experimental demonstration, J. Opt. Soc. Am. A., Aug. 2000, pp. 1440-1453, vol. 17, No. 8, Optical Society of America, USA.

Potstaid et al., Adaptive Scanning Optical Microscope (ASOM); large field of view and high resolution imaging using a MEMS deformable mirror, Proc. of SPIE, 2007, pp. 646706-1-646706-12, vol. 6467, SPIE, USA.

Lofving et al., Beam steering with two ferroelectric liquid-crystal spatial light modulators, Optics Letters, Oct. 1, 1998, pp. 1541-1543, vol. 23, No. 19, Optical Society of America, USA.

* cited by examiner

METHOD AND APPARATUS OF SIMULTANEOUS SPATIAL LIGHT MODULATOR BEAM STEERING AND SYSTEM ABERRATION CORRECTION

CROSS-REFERENCE TO RELATED APPLICATIONS

This application claims the benefit of U.S. Provisional Application 62/012,536 filed on Jun. 16, 2014.

BACKGROUND OF THE INVENTION

It is well known that mechanically rotating mirrors can redirect and steer optical beams. A fast steering mirror can be used to scan the beam while an adaptive optics element (e.g., a spatial light modulator) can be used to correct residual optical aberrations. See, e.g., U.S. Pat. No. 7,742,213 to Potsaid et al.; and B. Potsaid, L. I. Rivera, and J. T. Y. Wen, "Adaptive Scanning Optical Microscope (ASOM): large field of view and high resolution imaging using a MEMS deformable mirror—art. no. 646706," MEMS Adaptive Optics 6467, 46706-46706 (2007), both incorporated herein by reference. U.S. Pat. No. 7,742,213 to Potsaid et al. discloses an imaging system that uses a steering mirror to select the field of view and an "adaptive optics element" to compensate for optical aberrations. The parallel stochastic gradient descent optimization algorithm was used in that patent to set the adaptive optics element and correct for system optical aberrations. The purpose is to optimize microscope image quality. The method of redirecting and steering optical beams, which utilizes a fast steering mirror, imposes significant weight and size restrictions on the device.

The use of spatial light modulators ("SLM") to steer light beams by forming a blazed phase grating has been described in various references. See, e.g., U.S. Pat. No. 7,283,291 to Maram et al.; and B. Lofving et al., "Beam steering with two ferroelectric liquid-crystal spatial light modulators," Opt Lett 23, 1541-1543 (1998), both incorporated herein by reference. Such blazed phase grating devices use a blaze period and pitch to achieve a desired deflection angle. No adaptive phase correction is performed with the SLM to correct for aberrations that may be present due to the optical elements in the system. For example, U.S. Pat. No. 7,283,291 to Maram et al. uses an SLM to perform beam steering. In that patent, a blazed phase grating is induced on the SLM to perform the beam steering function. Forcing a blazed grating onto the SLM prevents Maram et al. from using the SLM to correct for any optical aberrations caused by the optional static optical elements described in the patent. Therefore, the laser power in the desired direction is typically not optimized because wide-field of view optics generally cause optical aberrations. As another example, the "Beam steering with two ferroelectric liquid-crystal spatial light modulators" paper by Lofving et al. uses an SLM for beam steering, a second SLM to block out higher order beams and a lens to angularly amplify the steering field of regard. Since a lens is used to angularly amplify the transmitted lower order beam, the lens increased field of regard will typically have optical aberrations yet there is no apparent plan to compensate for them in this design. Methods that utilize the spatial light modulator as a steering device, but which do not correct for system aberrations impose tight tolerance and lens design requirements on the system's optical elements in order to maintain a tight, focused beam.

BRIEF SUMMARY OF THE INVENTION

An embodiment of the invention includes an apparatus. The apparatus includes a spatial light modulator, a wide-field optical system, the wide-field optical system including at least one optical system aberration; and a camera. The wide-field optical system collimates a light beam toward the camera. The camera communicates with the spatial light modulator via a feedback loop that pre-corrects for the at least one optical system aberration.

Optionally, the camera detects a light beam from the feedback loop encoding system phase corrections and an ideal Fresnel zone plate on the spatial light modulator.

Optionally, the feedback loop comprises a computer processor performing the following steps. A previous intensity point spread function frame of the camera light beam is recorded on the camera and the previous intensity point spread function frame is set as the previous maximum intensity point spread function. Each pixel of the ideal Fresnel zone plate on the spatial light modulator is perturbed randomly and simultaneously. Another intensity point spread function frame of the light beam is recorded on the camera. Whether an intensity sharpness is greater for the another intensity point spread function frame than for the previous intensity point spread function frame is compared. The comparison includes adding a new phase aberration to the system phase corrections on the spatial light modulator, when the intensity sharpness of the another intensity point spread function frame is greater than for a previous maximum intensity point spread function. The comparison further includes subtracting the new phase aberration from the system phase corrections on the spatial light modulator, when the intensity sharpness of the another intensity point spread function frame is less than for the previous maximum intensity point spread function. The randomly and simultaneously perturbation of each pixel of the ideal Fresnel zone plate on the spatial light modulator, the recording of another intensity point spread function frame of the collimated light beam on the camera, and the comparison of whether an intensity sharpness is greater for the another intensity point spread function frame than for the previous intensity point spread function frame, is repeated until an aggregate pixel intensity is maximized.

Another embodiment of the invention includes a method. A spatial light modulator is illuminated with an input light beam, with the spatial light modulator focusing the light beam. The focused light beam from the spatial light modulator is steered to a front focal point of a wide-field optical system, the wide-field optical system including at least one optical system aberration. The steered light beam is angularly magnified using the wide-field optical system. The angularly magnified light beam is detected using a camera. The inverse of the optical aberration is encoded on the spatial light modulator to pre-correct for at least one optical system aberration using a feedback loop between the detector and the spatial light modulator.

Optionally, the camera detects a light beam, the feedback loop encoding system phase corrections and an ideal Fresnel zone plate on the spatial light modulator. A previous intensity point spread function frame of the camera light beam is recorded on the camera and the previous intensity point spread function frame is set as the previous maximum intensity point spread function. Each pixel of the ideal Fresnel zone plate on the spatial light modulator is perturbed randomly and simultaneously. Another intensity point spread function frame of the camera light beam is recorded on the camera. When the intensity sharpness is greater for the another intensity point spread function frame than for the previous intensity point spread function frame is compared. The comparing includes adding a new phase aberration to the system phase corrections on the spatial light modulator, when the intensity sharpness of the other intensity point spread function frame is greater than for a previous maximum intensity point spread function. The comparing further including subtracting the new phase aberration from the system phase corrections on the spatial light modulator, when the intensity sharpness of the other intensity point spread function frame is less than for the previous maximum intensity point spread function. The simultaneous random perturbation of each pixel of the ideal Fresnel zone plate on the spatial light modulator, the recording another intensity point spread function frame of the collimated light beam on the camera, and the comparing whether an intensity sharpness is greater for the another intensity point spread function frame than for the previous intensity point spread function frame, is repeated until an aggregate pixel intensity is maximized.

Optionally, generating a library of light beam steering directions by repeating said illumination of the spatial light modulator with an input light beam, the spatial light modulator focusing the light beam, said steering the focused light beam from the spatial light modulator to a front focal point of a wide-field optical system, the wide-field optical system comprising at least one optical system aberration, said angularly magnifying the steered light beam using the wide-field optical system, said detecting the angularly magnified light beam using a detector, and said encoding the inverse of the optical aberration on the spatial light modulator to pre-correct for at least one optical system aberration using a feedback loop between the detector and the spatial light modulator. Optionally, the focused light beam from the spatial light modulator is steered using the library of light beam steering directions.

Optionally, an embodiment of the invention provides non-mechanical holographic beam steering in an optical system that not only steers the beam in the appropriate direction, but also corrects for field-dependent, system optical lens aberrations simultaneously. Optionally, an embodiment of the invention removes lens tolerancing, lens aberrations, size and weight restrictions by actively correcting for lens aberrations while simultaneously using the SLM as a steering device, eliminating the need for a separate steering mirror. Such embodiments of the invention facilitate use of lower-cost, lower-quality optics while still maintaining a diffraction-limited beam in a wide-angle steering system.

Advantageously, a benefit of an embodiment of the invention is the simplicity in its design and operation. Beam steering is accomplished solely with a spatial light modulator and a wide-field optical system, which could be as simple as a single lens. No additional mechanical devices and/or mirrors are necessary to accomplish beam steering in at least one embodiment of the invention. In addition to the SLM acting as a steering device, the SLM also simultaneously acts as a wavefront corrector, reducing the requirement on high-precision, costly optics that minimize aberrations in low f-number optical systems. Whereas high-precision optical systems require multiple lenses to correct for the optical aberrations; this device reduces that requirement, allowing for a smaller, lighter system.

Optionally, applications for an embodiment of the invention include microscopy raster scanning, directed energy, and/or optical communications.

DETAILED DESCRIPTION OF THE INVENTION

Figure 1:
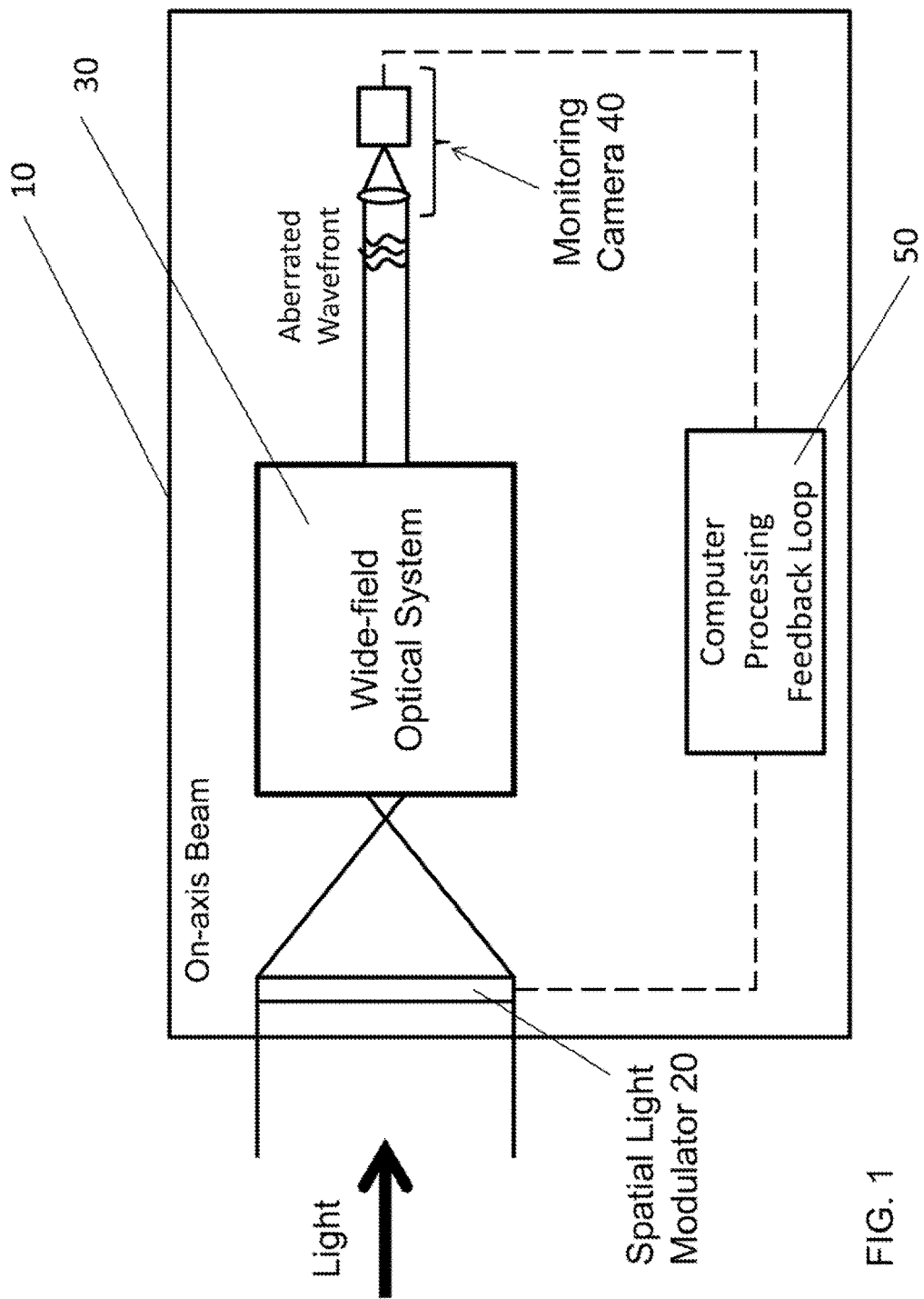
FIG. 1 is a block diagram of an embodiment of the present invention.
Figure 2:
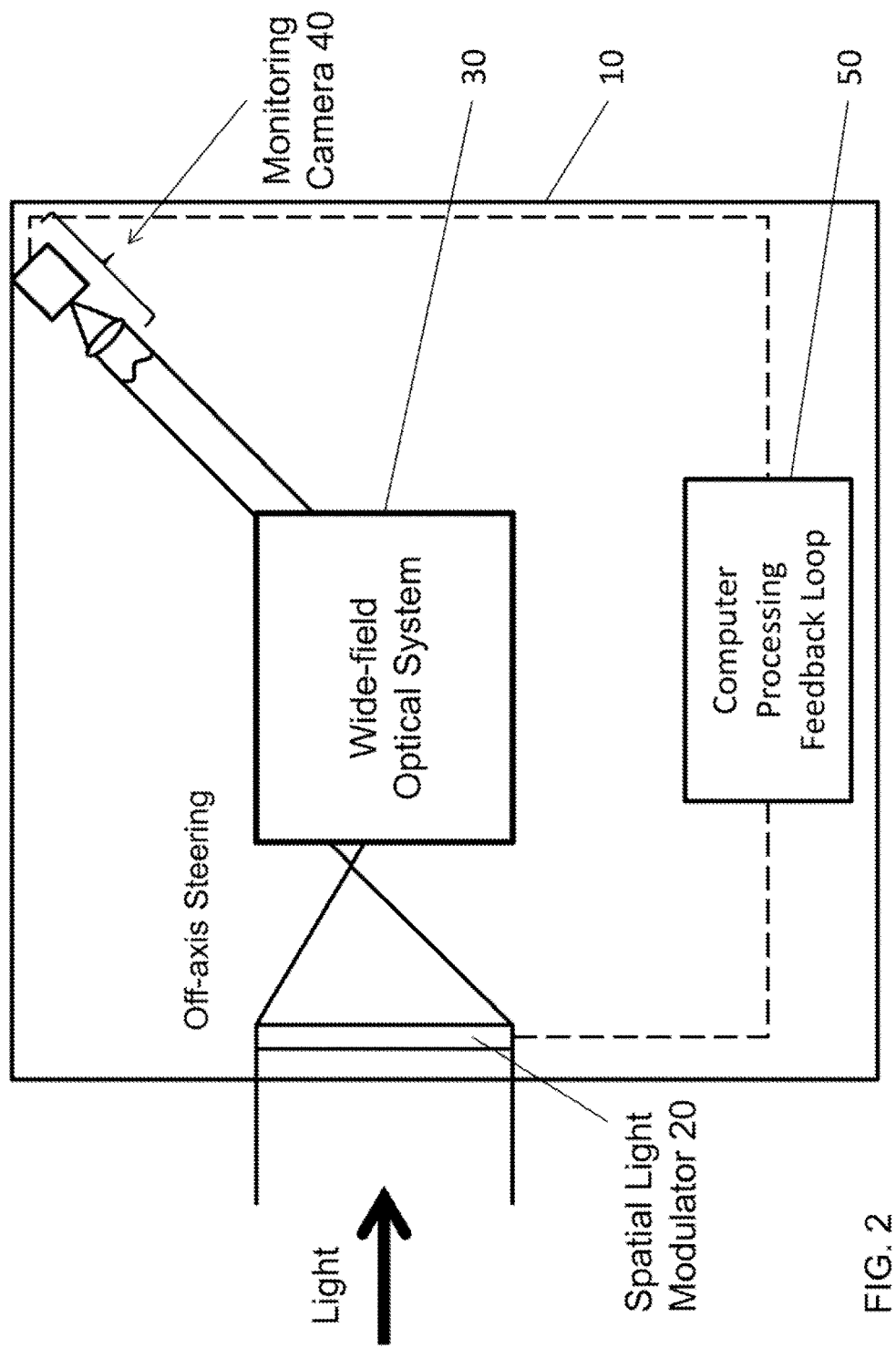
FIG. 2 is a block diagram of another embodiment of the present invention.

An embodiment of the present invention includes an apparatus 10, as shown by way of illustration in FIGS. 1 and 2. The apparatus includes a standard spatial light modulator 20, a standard wide-field optical system 30, the wide-field optical system including at least one optical system aberration; and a standard camera 40. The wide-field optical system 30 collimates a light beam toward the camera 40. The camera 40 communicates with the spatial light modulator 20 via a feedback loop 50 that pre-corrects for the at least one optical system aberration. Optionally, the wide-field optical system 30 includes a front focal point, the spatial light modulator 20 steering a focused light beam to the front focal point of the wide-field optical system. Optionally, the wide-field optical system 30 angularly magnifies the steered light beam from the spatial light modulator 20.

Optionally, the spatial light modulator 20 includes a reflective spatial light modulator, a transmissive spatial light modulator, an amplitude-only spatial light modulator, a phase-only spatial light modulator, and/or an amplitude and phase spatial light modulator. Optionally, the spatial light modulator includes a liquid crystal device, a plurality of micro-mirrors, or a deformable mirror.

Figure 3:
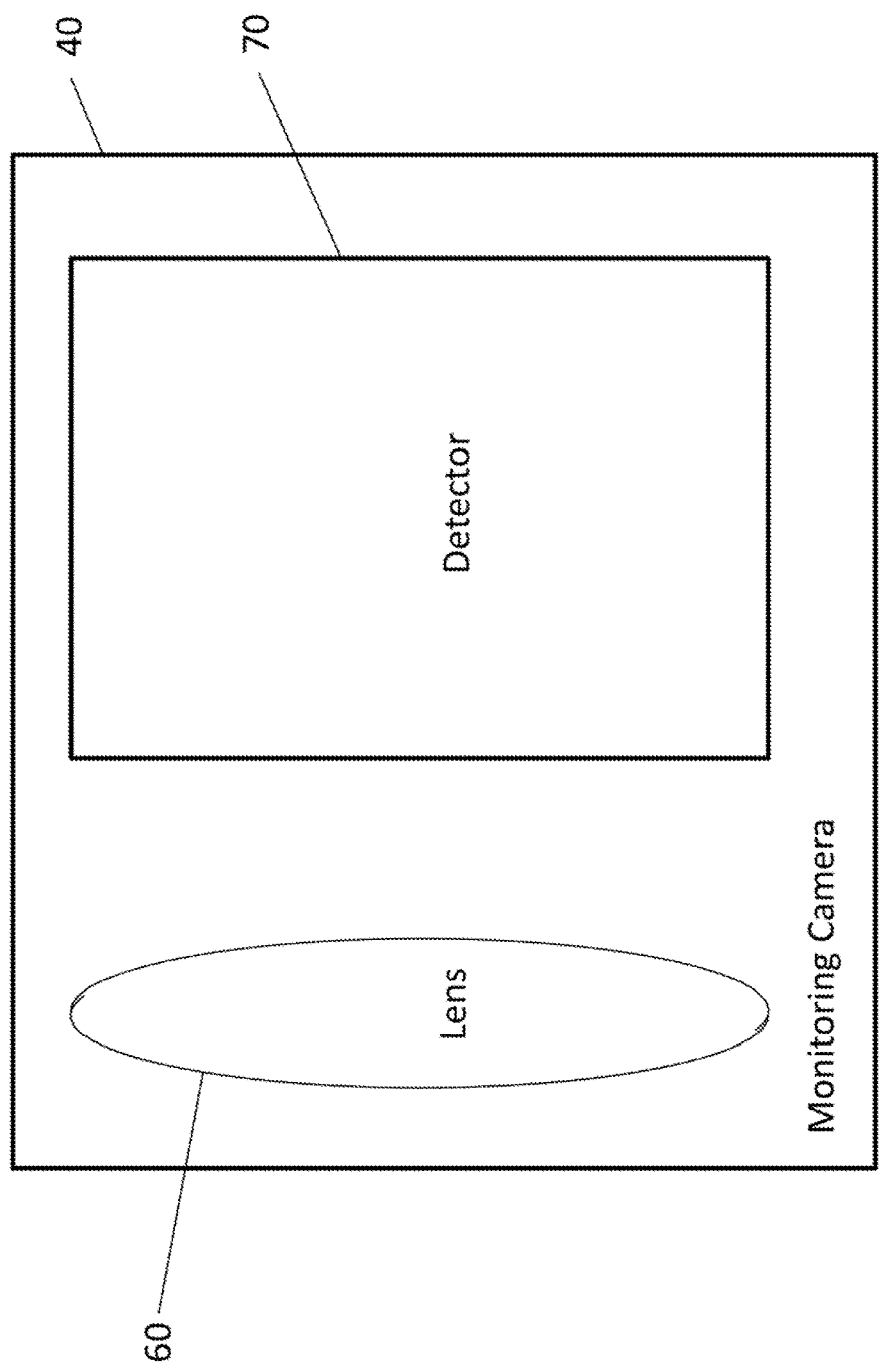
FIG. 3 is a block diagram of an illustrative monitoring camera according to an embodiment of the present invention.
Figure 4:
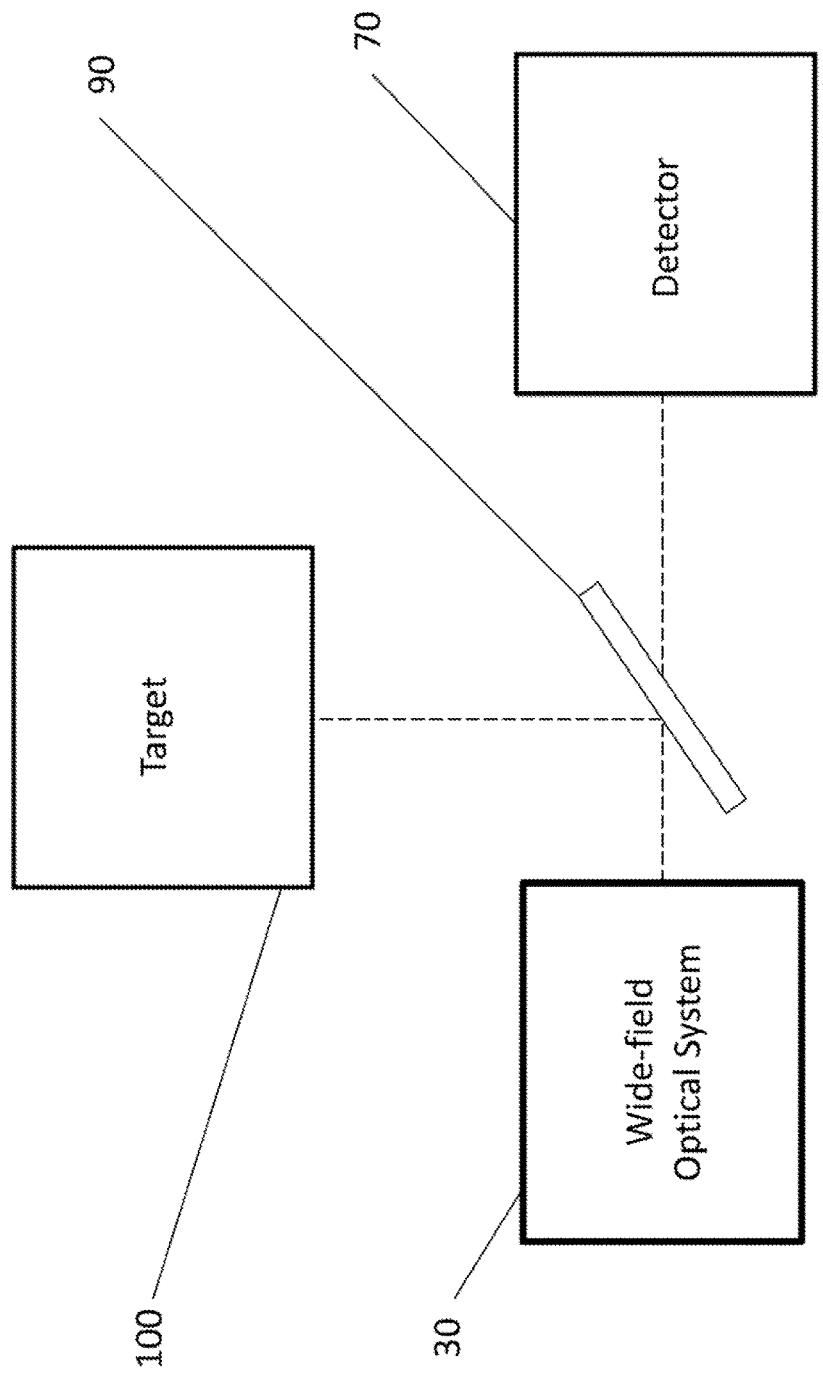
FIG. 4 is a block diagram of a portion of another embodiment of the present invention.

Optionally, the camera 40 includes a standard lens 60 receiving the collimated light beam and illuminating a standard detector (or focal plane array) 70, such as shown by way of illustration in FIGS. 3 & 4. One of ordinary skill in the art will recognize that acceptable parameters of the detector 70 (e.g., light power level, wavelength range, electrical bandwidth, and/or mechanical requirements) depend on the desired application. Optionally, the apparatus 10 further includes a beam splitter 90 optically interposed between the wide-field optical system 30 and the detector 70, thereby directing a first portion of the collimated light beam to a target 100 and a second portion of the collimated light beam toward the camera 40 (e.g., including the detector 70), such as shown by way of illustration in FIG. 4.

For example, a wide-field optical system 30 according to the present invention includes those discussed in U.S. patent application Ser. No. 14/205,803 to Cassella, incorporated herein by reference. Other examples of wide-field optical systems according to the present invention include standard wide-field optical systems employing a standard lens system including a single standard lens, a standard fisheye lens, a standard telescope, or a standard projection lens.

Optionally, the camera 40 receives a detector light beam, the feedback loop 50 encoding system phase corrections and an ideal Fresnel zone plate on the spatial light modulator 20.

Optionally, the feedback loop 50 comprises a computer processor performing the following steps. A previous intensity point spread function frame of the camera light beam is recorded on the camera 40 and the previous intensity point spread function frame is set as the previous maximum intensity point spread function. Each pixel of the ideal Fresnel zone plate on the spatial light modulator 20 is perturbed randomly and simultaneously. Another intensity point spread function frame of the camera light beam is recorded on the camera 40. Whether an intensity sharpness is greater for the another intensity point spread function frame than for the previous intensity point spread function frame is compared. The comparing includes adding a new phase aberration to the system phase corrections on the spatial light modulator 20, when the intensity sharpness of another intensity point spread function frame is greater than for a previous maximum intensity point spread function. The comparing further including subtracting the new phase aberration from the system phase corrections on the spatial light modulator 20, when the intensity sharpness of the another intensity point spread function frame is less than for the previous maximum intensity point spread function. The perturbing randomly and simultaneously each pixel of the ideal Fresnel zone plate on the spatial light modulator 20, the recording another intensity point spread function frame of the collimated light beam on the camera 40, and the comparing whether an intensity sharpness is greater for the another intensity point spread function frame than for the previous intensity point spread function frame, is repeated until an aggregate pixel intensity is maximized.

Another embodiment of the invention includes a method. A standard spatial light modulator 20 is illuminated with an input light beam, the spatial light modulator 20 reflects or transmits a focused light beam. The focused light beam from the spatial light modulator 20 is steered to a front focal point of a standard wide-field optical system 30, the wide-field optical system including at least one optical system aberration. The steered light beam is angularly magnified using the wide-field optical system 30. The angularly magnified light beam is detected using a standard camera 40. The inverse of the optical aberration is encoded on the spatial light modulator 20 to pre-correct for the at least one optical system aberration using a feedback loop between the camera 40 and the spatial light modulator.

Optionally, the camera includes a detector 70 and receives a detector light beam, the feedback loop encoding system phase corrections and an ideal Fresnel zone plate on the spatial light modulator 20. A previous intensity point spread function frame of the camera light beam is recorded on the camera 40 and the previous intensity point spread function frame is set as the previous maximum intensity point spread function. Each pixel of the ideal Fresnel zone plate on the spatial light modulator is perturbed randomly and simultaneously. Another intensity point spread function frame of the camera light beam is recorded on the camera 40. Whether an intensity sharpness is greater for the another intensity point spread function frame than for the previous intensity point spread function frame is compared. The comparing includes adding a new phase aberration to the system phase corrections on the spatial light modulator 20, when the intensity sharpness of another intensity point spread function frame is greater than for a previous maximum intensity point spread function. The comparing further including subtracting the new phase aberration from the system phase corrections on the spatial light modulator 20, when the intensity sharpness of the another intensity point spread function frame is less than for the previous maximum intensity point spread function. The perturbing randomly and simultaneously each pixel of the ideal Fresnel zone plate on the spatial light modulator 20, the recording another intensity point spread function frame of the collimated light beam on the camera 40, and the comparing whether an intensity sharpness is greater for the another intensity point spread function frame than for the previous intensity point spread function frame, is repeated until an aggregate pixel intensity is maximized.

Optionally, generating a library of light beam steering directions by repeating said impinging a spatial light modulator 20 with an input light beam, the spatial light modulator focusing light beam, said steering the focused light beam from the spatial light modulator to a front focal point of a wide-field optical system 30, the wide-field optical system comprising at least one optical system aberration, the angularly magnifying the steered light beam using the wide-field optical system, the detecting the angularly magnified light beam using a detector, and the encoding the inverse of the optical aberration on the spatial light modulator to pre-correct for the at least one optical system aberration using a feedback loop between the detector 70 and the spatial light modulator 20. Optionally, the focused light beam from the spatial light modulator 20 is steered using the library of light beam steering directions.

Another embodiment of the invention is described as follows with reference to, by way of illustration, FIGS. 1 and 2. This embodiment provides well-corrected, diffraction limited optical beams that are simultaneously steered and wavefront corrected with a spatial light modulator, instead of independently.

FIG. 1 shows illustrative device components in an on-axis arrangement. Light impinges on a spatial light modulator ("SLM") 20. The SLM has a phasefront consistent with a Fresnel zone plate or with a focal length $f_1$. The wide-field optical system 30 is located a distance $f_1+f_2$ away from the spatial light modulator 20, where $f_2$ is the focal length of the wide-field optical system. The wide-field optical system 30 collimates the light and the ratio of focal lengths $f_2/f_1$ provides angular magnification of the beam.

Short focal length, low f-number optical systems, which allow for compact systems in overall length, typically have increased aberrations since aberrations scale inversely with f-number. For example, spherical aberration $\propto 1/(F/\#)^3$, coma $\propto 1/(F/\#)^2$ and astigmatism $\propto 1/(F/\#)$. See, e.g., W. J. Smith, *Modern optical engineering: the design of optical systems* (McGraw Hill, 2008).

The output from the wide-field optical system 30 is monitored with a standard camera 40 and the resulting point spread function from the initially aberrated beam is detected.

The intensity PSF from the camera 40 is used in a standard Stochastic Parallel Gradient Descent ("SPGD") optimization algorithm. Detailed descriptions of the Stochastic Parallel Gradient Descent algorithm can be found in various references. See, e.g., M. A. Vorontsov, and V. P. Sivokon. "Stochastic parallel-gradient-descent technique for high-resolution wave-front phase-distortion correction," J Opt Soc Am A 15, 2745-2758 (1998); and M. A. Vorontsov, G. W. Carhart, M. Cohen, and G. Cauwenberghs, "Adaptive optics based on analog parallel stochastic optimization: analysis and experimental demonstration," J Opt Soc Am A 17, 1440-1453 (2000), both incorporated herein by reference.

The Fresnel zone plate on the spatial light modulator 20 is perturbed with a small, random wavefront. The updated PSF is displayed on the monitoring camera 40 and a standard image sharpness metric is calculated. For example, an illustrative image sharpness metric of $$J = \sum_{x,y} [I(x, y)]^\beta$$

where I(x,y) is the intensity in the image plane and $\beta$ is a scalar quantity. If that random wavefront improves the image sharpness, a scalar quantity of the perturbation wavefront is added to the original wavefront according to the SPGD algorithm, namely, $u^{(k+1)}=u^{(k)}+\gamma\Delta u^{(k)}\Delta J^{(k)}$, k=0, 1, ... where u are the wavefront coefficients (or control signals), k is the iteration number, $\gamma$ is a scalar gain coefficient, $\Delta u=\{u_1, u_2, u_3, \ldots u_N\}$ are statistically independent, random perturbations of u with a zero mean and equal variance, and $\Delta J=J(u)-J(u-\Delta u)$.

By adding small perturbations to the initial Fresnel zone plate on the spatial light modulator 20, the system pre-corrects for the aberrations present in the wide-field optical system 30 and the resulting optical beam is well-corrected.

To steer the beam, a different Fresnel zone plate is imprinted on the spatial light modulator 20 to shift the focal spot position in the x-direction or they-direction (or both). The resulting beam traverses through the wide-field optical system 30 at a different optical path for each steering position. The monitoring camera 40 needs to be moved to each steering position and the SPGD) optimization should be performed for each steering angle to optimally correct for the wavefront impinging at that given angle. Since the beam is only passing through a portion of the wide-field optical system 30 (though not the entire lens) at a single steering angle, the aberration correction needed for a particular steering angle will be low order, compared to having to correct for the entire lens aberrations across the entire field-of-view; this lessens the requirements on the spatial light modulator 20 and makes the aberration correction very practical.

The aberration correction via SPGD can be performed in real-time, or be done as an initial characterization stage and the specific aberrations/wavefronts across the field of view can be stored in a library to recall steering in a particular direction.

Also, it should be noted that this approach corrects for aberrations throughout the optical system (not solely the wide-field optical system). If the incoming light illuminating the spatial light modulator 20 and/or the spatial light modulator itself introduces wavefront errors, this optimization corrects for those errors as well.

In an embodiment of the present invention, there is no back-propagating beam; the forward propagating hologram is mathematically calculated from a given azimuth and elevation angle (to steer the beam) and Stochastic Parallel Gradient Descent optimization estimates and corrects for additional phase errors. A back-propagating beam requires pre-characterization prior to use and/or a return signal from the desired pointing angle; this invention does not require a pre-characterization step and instead the simultaneously beam steering and phase correction can be done in real-time (i.e., on-the-fly correction).

An embodiment of the invention comprises a feedback loop computer program, which computer program embodies the functions, filters, or subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

One of ordinary skill in the art will recognize that the methods, systems, and control laws discussed above with respect to image processing may be implemented in software as software modules or instructions, in hardware (e.g., a standard field-programmable gate array ("FPGA") or a standard application-specific integrated circuit ("ASIC"), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data processing devices. The data signals can carry any or all of the data disclosed herein that is provided to or from a device.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   a spatial light modulator;
   a wide-field optical system comprising at least one optical system aberration, said wide-field optical system comprising a front focal point, said spatial light modulator steering a light beam to the front focal point of the wide-field optical system such that said wide-field optical system receives the light beam from said spatial light modulator; and a camera, said wide-field optical system collimating the light beam toward said camera, said camera communicating with said spatial light modulator via a feedback loop that pre-corrects for said at least one optical system aberration.

2. The apparatus according to claim 1, wherein said camera comprises a lens receiving said collimated light beam and outputting light beam toward one of a detector and a focal plane array.

3. The apparatus according to claim 2, wherein said camera detects incoming light,
said feedback loop encoding system phase corrections and an ideal Fresnel zone plate on said spatial light modulator.

4. The apparatus according to claim 3, wherein said feedback loop comprises a computer processor performing the steps of:
recording a previous intensity point spread function frame of the camera light beam on the camera and setting the previous intensity point spread function frame as the previous maximum intensity point spread function;
perturbing randomly and simultaneously each pixel of the ideal Fresnel zone plate on the spatial light modulator;
recording another intensity point spread function frame of the camera light beam on the camera;
comparing whether an intensity sharpness is greater for the another intensity point spread function frame than for the previous intensity point spread function frame, wherein said comparing comprises adding a new phase aberration to the system phase corrections on the spatial light modulator, when the intensity sharpness of the another intensity point spread function frame is greater than for a previous maximum intensity point spread function, wherein said comparing further comprises subtracting the new phase aberration from the system phase corrections on the spatial light modulator, when the intensity sharpness of the another intensity point spread function frame is less than for the previous maximum intensity point spread function; and
repeating said perturbing randomly and simultaneously each pixel of the ideal Fresnel zone plate on the spatial light modulator, said recording another intensity point spread function frame of the collimated light beam on the camera, and said comparing whether an intensity sharpness is greater for the another intensity point spread function frame than for the previous intensity point spread function frame, until an aggregate pixel intensity is maximized.

5. The apparatus according to claim 2, further comprising:
a beam splitter optically interposed between said wide-field optical system and said detector, thereby directing a first portion of the collimated light beam to a target and a second portion of the collimated light beam toward said detector.

6. The apparatus according to claim 1, wherein said spatial light modulator comprises at least one of a reflective spatial light modulator, a transmissive spatial light modulator, an amplitude-only spatial light modulator, a phase-only spatial light modulator, and an amplitude and phase spatial light modulator.

7. The apparatus according to claim 1, wherein said spatial light modulator comprises one of a liquid crystal device, a plurality of micro-mirrors, and a deformable mirror.

8. An apparatus comprising:
a spatial light modulator;
a wide-field optical system comprising at least one optical system aberration, said wide-field optical system comprising a front focal point, said spatial light modulator steering a focused light beam to the front focal point of the wide-field optical system so that said wide-field optical system receives the focused light beam from said spatial light modulator; and
a camera, said wide-field optical system collimating a light beam toward said camera, said camera communicating with said spatial light modulator via a feedback loop that pre-corrects for said at least one optical system aberration, wherein said wide-field optical system angularly magnifies the steered light beam from said spatial light modulator.

9. A method comprising:
illuminating a spatial light modulator with an input light beam, the spatial light modulator outputting a focused light beam;
steering the focused light beam from the spatial light modulator to a front focal point of a wide-field optical system, the wide-field optical system comprising at least one optical system aberration;
angularly magnifying the steered light beam using the wide-field optical system;
detecting the angularly magnified light beam using a camera; and
encoding the inverse of the optical aberration on the spatial light modulator to pre-correct for the at least one optical system aberration using a feedback loop between the camera and the spatial light modulator.

10. The method according to claim 9, wherein said camera receives a camera light beam, the feedback loop encoding system phase corrections and an ideal Fresnel zone plate on the spatial light modulator, wherein said method further comprises:
recording a previous intensity point spread function frame of the camera light beam on the camera and setting the previous intensity point spread function frame as the previous maximum intensity point spread function;
perturbing randomly and simultaneously each pixel of the ideal Fresnel zone plate on the spatial light modulator;
recording another intensity point spread function frame of the camera light beam on the camera;
comparing whether an intensity sharpness is greater for the another intensity point spread function frame than for the previous intensity point spread function frame, wherein said comparing comprises adding a new phase aberration to the system phase corrections on the spatial light modulator, when the intensity sharpness of the another intensity point spread function frame is greater than for a previous maximum intensity point spread function, wherein said comparing further comprises subtracting the new phase aberration from the system phase corrections on the spatial light modulator, when the intensity sharpness of the another intensity point spread function frame is less than for the previous maximum intensity point spread function; and
repeating said perturbing randomly and simultaneously each pixel of the ideal Fresnel zone plate on the spatial light modulator, said recording another intensity point spread function frame of the collimated light beam on the camera, and said comparing whether an intensity sharpness is greater for the another intensity point spread function frame than for the previous intensity point spread function frame, until an aggregate pixel intensity is maximized.

11. The method according to claim 9, further comprising: generating a library of light beam steering directions by repeating said impinging a spatial light modulator with an input light beam, the spatial light modulator one of reflecting and transmitting a focused light beam, said steering the focused light beam from the spatial light modulator to a front focal point of a wide-field optical system, the wide-field optical system comprising at least one optical system aberration, said angularly magnifying the steered light beam using the wide-field optical system, said detecting the angularly magnified light beam using a detector, and said encoding the inverse of the optical aberration on the spatial light modulator to pre-correct for the at least one optical system aberration using a feedback loop between the detector and the spatial light modulator.

12. The method according to claim 9, further comprising: steering the focused light beam from the spatial light modulator using the library of light beam steering directions.

* * * * *